(12) United States Patent
Swartz

(10) Patent No.: US 11,040,485 B2
(45) Date of Patent: Jun. 22, 2021

(54) ADDITIVE MANUFACTURING METHOD AND APPARATUS

(71) Applicant: Robert Swartz, Highland Park, IL (US)

(72) Inventor: Robert Swartz, Highland Park, IL (US)

(73) Assignee: Impossible Objects, Inc., Northbrook, IL (US)

( * ) Notice: Subject to any disclaimer, the term of this patent is extended or adjusted under 35 U.S.C. 154(b) by 0 days.

(21) Appl. No.: 16/298,630

(22) Filed: Mar. 11, 2019

(65) Prior Publication Data

US 2019/0202164 A1 Jul. 4, 2019

Related U.S. Application Data

(60) Division of application No. 15/631,611, filed on Jun. 23, 2017, now Pat. No. 10,252,487, which is a
(Continued)

(51) Int. Cl.
*B33Y 30/00* (2015.01)
*B29C 64/147* (2017.01)
(Continued)

(52) U.S. Cl.
CPC ............ *B29C 64/147* (2017.08); *B29C 43/20* (2013.01); *B29C 64/153* (2017.08);
(Continued)

(58) Field of Classification Search
CPC ... B41F 5/24; B41F 7/02; B41F 13/11; B41M 1/04; B41M 1/06; B33Y 10/00
(Continued)

(56) References Cited

U.S. PATENT DOCUMENTS

| 1,774,078 A | * | 8/1930 | Belluche | .................. B41G 1/00 |
| | | | | 101/174 |
| 3,431,166 A | | 3/1969 | Mizutani | |

(Continued)

FOREIGN PATENT DOCUMENTS

| CN | 101181776 A | 5/2008 |
| CN | 201329424 Y | 10/2009 |

(Continued)

OTHER PUBLICATIONS

Non-Final Rejection in U.S. Appl. No. 14/566,661 ("Tow Stabilization Method and Apparatus"), dated Mar. 21, 2017.
(Continued)

*Primary Examiner* — Scott W Dodds
(74) *Attorney, Agent, or Firm* — Robert Greenspoon; Flachsbart & Greenspoon, LLC

(57) ABSTRACT

An additive manufacturing method and apparatus is described for the printing of three-dimensional (3D) objects. The approach is based on a composite-based additive manufacturing process, except it uses commercial printing methods to achieve even higher speed and throughput. By using the invention, a prototyping and/or production process may be completed in hours rather than months, and the risks and problems of molds is eliminated. There is substantial improvement in the number and type of geometries that can be produced compared to injection molding, and the range of materials is enlarged as are the material properties. The method involves printing a substrate having at least one sheet using a printing technology, and stacking or folding the at least one sheet to form multiple layers consistent with that formed by a 3D model. The printing step is done using a printing technology such as flexography, lithography, offset, gravure, waterless printing, and silkscreen.

5 Claims, 10 Drawing Sheets

Related U.S. Application Data continuation of application No. PCT/US2016/062319, filed on Nov. 16, 2016.

(60) Provisional application No. 62/256,413, filed on Nov. 17, 2015.

(51) Int. Cl.
*B29C 43/20* (2006.01)
*B33Y 10/00* (2015.01)
*B29C 64/153* (2017.01)
*B29C 64/165* (2017.01)
*B32B 5/02* (2006.01)
*B32B 7/12* (2006.01)

(52) U.S. Cl.
CPC ............ *B29C 64/165* (2017.08); *B32B 5/022* (2013.01); *B32B 5/024* (2013.01); *B32B 7/12* (2013.01); *B33Y 10/00* (2014.12); *B33Y 30/00* (2014.12)

(58) Field of Classification Search
USPC ........................................................ 700/119
See application file for complete search history.

(56) References Cited

U.S. PATENT DOCUMENTS

| | | | |
|---|---|---|---|
| 4,312,268 A | 1/1982 | King et al. | |
| 4,393,389 A | 7/1983 | Rasekhi et al. | |
| 4,453,694 A | 6/1984 | Andreasson | |
| 4,863,538 A | 9/1989 | Deckard | |
| 5,176,949 A | 1/1993 | Allagnat et al. | |
| 5,204,055 A | 4/1993 | Sachs et al. | |
| 5,260,009 A | 11/1993 | Penn | |
| 5,340,656 A | 8/1994 | Sachs et al. | |
| 5,364,657 A | 11/1994 | Throne | |
| 5,369,192 A | 11/1994 | Ko et al. | |
| 5,514,232 A | 5/1996 | Burns | |
| 5,637,175 A | 6/1997 | Feygin et al. | |
| 5,876,550 A | 3/1999 | Feygin et al. | |
| 5,988,959 A | 11/1999 | Sugata | |
| 6,147,138 A | 11/2000 | Hochsmann et al. | |
| 6,161,995 A | 12/2000 | Wakazono et al. | |
| 6,471,800 B2 | 10/2002 | Jang et al. | |
| 6,551,038 B1 | 4/2003 | Sugata et al. | |
| 6,596,224 B1 | 7/2003 | Sachs et al. | |
| 6,632,054 B2 | 10/2003 | Geiger et al. | |
| 6,740,185 B2 | 5/2004 | Baldwin | |
| 6,780,368 B2 | 8/2004 | Liu et al. | |
| 8,377,547 B2 | 2/2013 | Noguchi et al. | |
| 2001/0011507 A1* | 8/2001 | Korem ................. | B41C 1/1075 101/217 |
| 2002/0104935 A1 | 8/2002 | Schweizer | |
| 2004/0070582 A1 | 4/2004 | Smith et al. | |
| 2004/0112523 A1 | 6/2004 | Crom et al. | |
| 2005/0059757 A1 | 3/2005 | Bredt et al. | |
| 2005/0170153 A1* | 8/2005 | Miller .................. | B41M 5/0064 428/195.1 |
| 2006/0061618 A1 | 3/2006 | Hernandez et al. | |
| 2007/0241482 A1 | 10/2007 | Giller et al. | |
| 2008/0006958 A1 | 1/2008 | Davidson | |
| 2008/0260954 A1 | 10/2008 | Paton et al. | |
| 2009/0255428 A1 | 10/2009 | Stiel | |
| 2009/0321979 A1 | 12/2009 | Hiraide | |
| 2010/0302326 A1 | 12/2010 | Morohoshi et al. | |
| 2011/0045724 A1 | 2/2011 | Bahukudumbi | |
| 2011/0101564 A1 | 5/2011 | Keenihan et al. | |
| 2011/0121491 A1 | 5/2011 | Costabeber | |
| 2012/0059503 A1 | 3/2012 | Pax et al. | |
| 2013/0171431 A1 | 7/2013 | Swartz et al. | |
| 2014/0238173 A1 | 8/2014 | Swartz et al. | |
| 2014/0257549 A1 | 9/2014 | Swartz et al. | |
| 2015/0137423 A1 | 5/2015 | Ding | |
| 2015/0158246 A1 | 6/2015 | Swartz et al. | |
| 2015/0231825 A1 | 8/2015 | Swartz et al. | |
| 2016/0082657 A1 | 3/2016 | Swartz et al. | |
| 2016/0082658 A1 | 3/2016 | Swartz et al. | |
| 2016/0082695 A1 | 3/2016 | Swartz et al. | |
| 2016/0339645 A1 | 11/2016 | Swartz et al. | |

FOREIGN PATENT DOCUMENTS

| | | |
|---|---|---|
| CN | 104150915 A | 11/2014 |
| EP | 2776233 A2 | 9/2014 |
| EP | 2961585 A2 | 1/2016 |
| JP | H11236541 | 8/1999 |
| WO | WO-2007114895 A2 | 10/2007 |
| WO | WO-2013010108 A1 | 1/2013 |
| WO | WO-2013033273 A2 | 3/2013 |
| WO | WO 2014134224 A | 9/2014 |
| WO | WO-2014134224 A2 | 9/2014 |

OTHER PUBLICATIONS

Applicant Initiated Interview Summary in U.S. Appl. No. 14/703,372 ("... Flattened Substrate Sheets"), dated Feb. 9, 2017.
Invitation to Pay Additional Fees for International Application No. PCT/US17/17672 ("Method/Apparatus Automated Composite-Based Additive Manufacturing"), dated Apr. 17, 2017.
Non-Final Rejection in U.S. Appl. No. 13/582,939 ("Methods and Apparatus for 3D Fabrication"), dated Apr. 27, 2017.
Decision on Protest for PCT/US17/17672 ("Method and Apparatus for Automated Composite-Based Additive Manufacturing"), dated May 26, 2017.
Final Rejection in U.S. Appl. No. 14/190,912 ("Methods and Apparatus for Construction of Machine Tools"), dated Jun. 13, 2017.
Non-Final Rejection in U.S. Appl. No. 14/199,603 ("Methods and Apparatus for Photosculpture"), dated Apr. 12, 2016.
Restriction Requirement in U.S. Appl. No. 14/566,661 ("Tow Stabilization Method and Apparatus"), dated Dec. 9, 2016.
Restriction Requirement in U.S. Appl. No. 14/703,372 ("Methods and Apparatus for Three Dimensional Printed Composites Based on Flattened Substrate Sheets"), dated Jul. 25, 2016.
Non-Final Rejection in U.S. Appl. No. 14/703,372 ("Methods and Apparatus for Three Dimensional Printed Composites Based on Flattened Substrate Sheets"), dated Dec. 22, 2016.
International Search Report and Written Opinion in International Application No. PCT/US16/62319 ("Additive Manufacturing Method and Apparatus"), dated Jan. 23, 2017.
International Search Report and Written Opinion in International Application No. PCT/US16/62356 ("... Metal Matrix Composites ..."), dated Jan. 23, 2017.
Extended European Search Report in EP20140757160 ("Method and Apparatus for Three-Dimensional Printed Composites"), dated Jul. 4, 2016.
Restriction in U.S. Appl. No. 14/190,912 ("Methods and Apparatus for Construction of Machine Tools"), dated Dec. 1, 2015.
Restriction in U.S. Appl. No. 14/190,912 ("Methods and Apparatus for Construction of Machine Tools"), dated Jun. 24, 2016.
Non-Final Rejection in U.S. Appl. No. 14/190,912 ("Methods and Apparatus for Construction of Machine Tools"), dated Oct. 3, 2016.
International Search Report for PCT/US12/52946 ("Methods and Apparatus for 3D Fabrication"), dated Jan. 10, 2013.
J. Eltgen, A Short Review of Magnetography and Its Related Materials Problems, Ind. Eng. Chem. Prod. Res. Dev., vol. 24, No. 2, 1985, pp. 196-201.
Extended European Search Report, from EP Application No. 12828967 (EP20120828967) ("Methods and Apparatus for 3D Fabrication"), Jun. 9, 2015.
International Search Report for International Applicaton No. PCT/US14/18806 ("Methods and Apparatus for Three-Dimensional Printed Composites"), dated Aug. 5, 2014.
Invitation to Pay Additional Fees for International Applicaton No. PCT/US14/18806 ("Methods and Apparatus for Three-Dimensional Printed Composites"), dated May 6, 2014.

(56) References Cited

OTHER PUBLICATIONS

Decision on Protest for International Applicaton No. PCT/US14/18806 ("Methods and Apparatus for Three-Dimensional Printed Composites"), dated Jun. 19, 2014.
Restriction Requirement in U.S. Appl. No. 13/582,939 ("Methods and Apparatus for 3D Fabrication"), dated Sep. 30, 2015.
Non-Final Rejection in U.S. Appl. No. 13/582,939 ("Methods and Apparatus for 3D Fabrication"), dated Mar. 29, 2016.
Final Rejection in U.S. Appl. No. 13/582,939 ("Methods and Apparatus for 3D Fabrication"), dated Oct. 7, 2016.
Non-Final Rejection in U.S. Appl. No. 14/835,690 ("Apparatus for Fabricating Three-Dimensional Printed Composites"), dated Nov. 15, 2016.

\* cited by examiner

ADDITIVE MANUFACTURING METHOD AND APPARATUS

This application claims the benefit of U.S. Provisional Application No. 62/256,413, filed Nov. 17, 2015. This application incorporates the following applications by reference (including their drawing figures): Application Nos. U.S. 61/528,537; PCT/US12/52946; U.S. Ser. No. 13/582,939; EP20120828967; U.S. 61/769,724; PCT/US14/18806; U.S. Ser. No. 14/835,685; U.S. Ser. No. 14/835,690; U.S. Ser. No. 14/835,697; U.S. Ser. No. 14/703,372; U.S. 62/243,590; U.S. 61/773,810; U.S. Ser. No. 14/199,603; U.S. 61/914,613; and U.S. Ser. No. 14/566,661. This is also a continuation of application Ser. No. 15/631,611 filed Jun. 23, 2017 which is hereby also incorporated by reference in its entirety.

TECHNICAL FIELD OF THE INVENTION

The present invention relates generally to three-dimensional fabrication or what is generally known as additive manufacturing.

BACKGROUND OF THE INVENTION

Nature constructs three-dimensional objects with ease and out of a seemingly unlimited variety of materials with limitless geometries and scales. From prehistoric times to the present people have come up with innumerable ways of constructing physical things. One of the most ubiquitous methods of making things created in the twentieth century is injection molding. Injection molding has a number of advantages. It is a mass production process and can produce parts cheaply and quickly. It can use a large number of thermoplastic materials and produce durable lightweight parts. It does have a number of problems and limitations. The tools for injection molding are expensive and take a long time to make, on the order of months. In addition often the molds do not work correctly when first used and have to be modified. The molds wear out and cause flash. The parts shrink and warp. After repeated use molds often break or wear out. Because of the limitation of injection molding there are many restrictions in the geometry of parts that can be produced. Undercuts and other kinds of geometries that cannot be removed from a press cannot be made. This leads to assembly of multiple parts. Objects with moving parts generally cannot be built. In addition it is very difficult to decorate parts when they are molded. The process is limited to the use of polymers and the use of high performance polymers like PEEK is very difficult and injection molding cannot produce true composite parts.

Present conventional additive manufacturing technologies (e.g., 3D printing) also have a number of problems. These include slow production times, poor material properties, and limited material selection. For all of these reasons there is a long felt need to improve the process by which three-dimensional objects are made.

Printing technologies on the other hand can produce books extremely quickly at low cost and have hundreds of years of improvement in their methods. In particular, lithography, flexography, gravure and waterless printing and silkscreen (among others) are mature fast technologies that can mass-produce products at great speeds and low costs. Books, magazines and newspapers are produced quickly and cheaply. The cost of making plates is very inexpensive and the process is quite quick. There is also well-developed technology related to folding and cutting.

Every page of a book is potentially different and the technology to produce such books is widely available. This can be true even when every sheet that comes off a printer from which the pages are made can be identical to one another.

Offset lithography is a particularly mature and suitable technology for mass production of paper items—maps, newspapers, packaging and books. As with all lithography from the past two hundred years, offset lithography relies on the immiscibility of oil and water. In modern offset lithography, a special polyester, mylar, metal, or paper printing plate is used. A photosensitive emulsion covers the surface of the plate. Ultraviolet light shines on the emulsion through a photographic negative, resulting in the emulsion having the "positive" image of the original source. This step can also be performed by direct laser imaging using a platesetter. A chemical process then typically removes non-image portions of the plate. The treated plate is now fixed to a roller on a printing press. Other rollers apply water, which cover the blank non-image portions. This image formed by the selectively deposited water is transferred to a blanket usually made of rubber. The blanket is now inked with an oil based ink, and the ink is deposited where there is no water. The ink is then transferred from the rubber blanket onto paper, usually through a process that sandwiches the paper between the rubber blanket roller and an impression cylinder, which creates counter-pressure. As a result, the printed sheet also has the "positive" of the original source image, just as the photoemulsion lithography plate did.

SUMMARY OF THE INVENTION

An additive manufacturing which takes advantage of the printing methods to solve many of the problems discussed above is described.

The approach is based on the CBAM process ("composite-based additive manufacturing"), except that it takes advantage of conventional printing technology. The CBAM process works by using, for example, an inkjet printer to print each page and uses digital methods to make each page different. This approach has the advantage that three-dimensional objects may be made individually, without expensive tooling costs and with very few geometric restrictions. Since every page is printed individually each page can be different and there is no need for any tooling. However by using conventional printing techniques this process can be made much faster since conventional printing methods can run many times faster than inkjet methods. This means that three dimensional parts can be made at greater speed and lower costs than conventional injection molding and eliminates expensive tooling costs and long tooling lead times and the problem that often occurs the first time a tool is used as it needs to be modified to work.

By using the invention, a given mass production process may be completed in hours rather than months, and the risks and problems of molds is also eliminated. There is substantial improvement in the number and type of geometries that can be produced, and the range of materials is enlarged as are the material properties.

In brief, offset conventional printing methods and others may be used to create sheets (multiple pages) often called signatures of printed substrate and bonding agents for respective layers of an object (the bonding agent can be a polymer powder)—the beginning step of a CBAM 3D printing operation. Essentially the inkjet step of the process is replaced with conventional printing and then powdering powder removal, stacking heating and fusing, and excess material removal are done as would have been done as described in the earlier patents (Application Nos. U.S. 61/528,537; PCT/US12/52946; U.S. Ser. No. 13/582,939; EP20120828967; U.S. 61/769,724; PCT/US14/18806; U.S. Ser. No. 14/835,685; U.S. Ser. No. 14/835,690; U.S. Ser. No. 14/835,697; U.S. Ser. No. 14/703,372; U.S. 62/243,590). The resulting treated sheet is appropriately folded, and possibly cut with due regard for registration and alignment, using automated conventional folding processes. This puts the individual "pages" in order. The folded item can then be compressed and heated to permit fusing between layers, and then unwanted waste material can be removed as usual (e.g., by sandblasting).

DETAILED DESCRIPTION OF INVENTION

Figure 1:
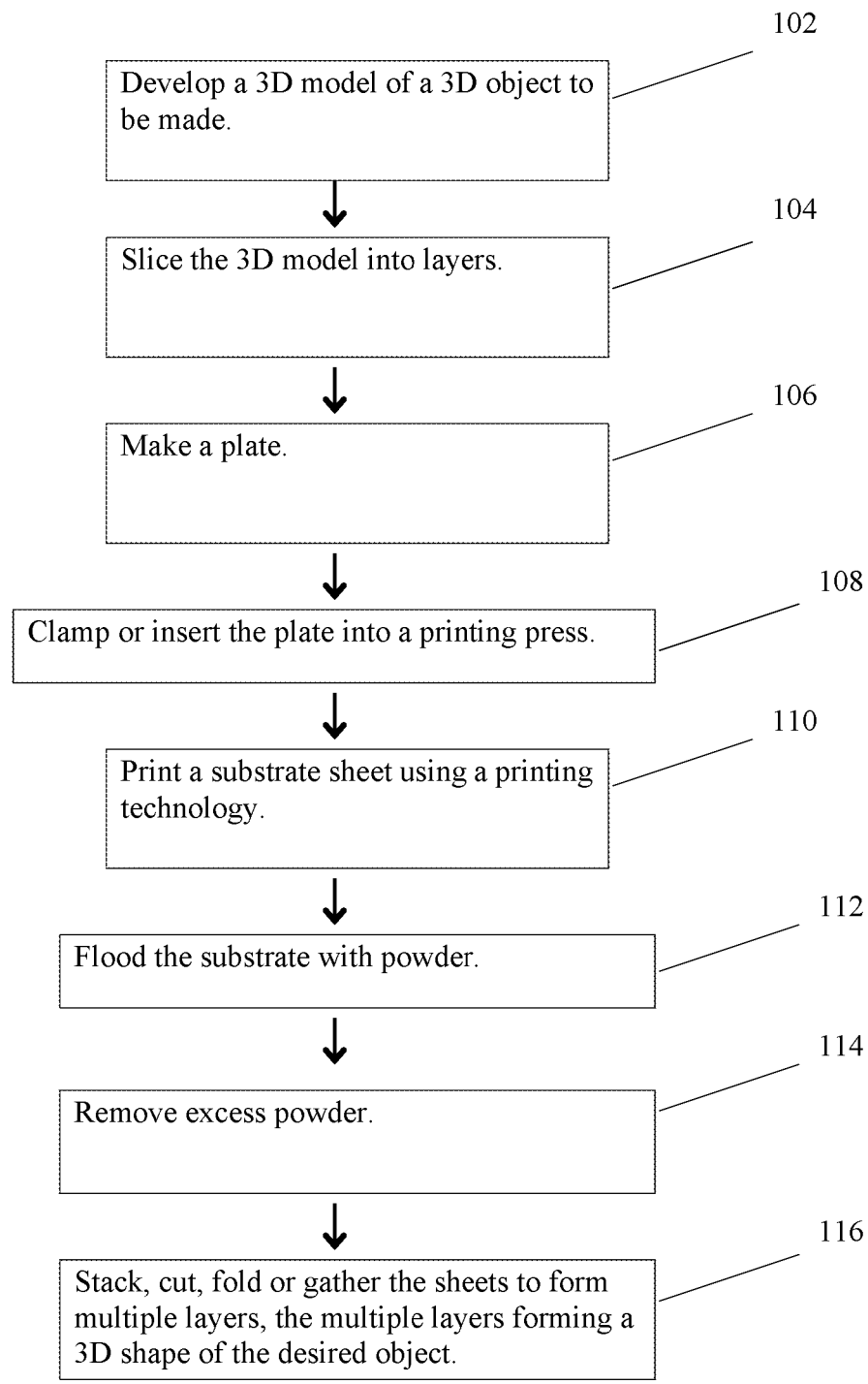
FIG. 1 is a flowchart illustrating the process for additive manufacturing of a 3D object.

Using a book example the process of this invention is described as follows. FIG. 1 is a flowchart illustrating the process for additive manufacturing of a 3D object. Flexography, or gravure may be used since it can easily print with aqueous based inks which are particularly suited for the CBAM process, and is traditionally used in product packaging printing to make large areas of solid color. However, oil based inks for example as used in conventional lithography can also be used. In addition a conventional lithography press can be modified so that ink solution is transferred from the plate to the substrate or the ink solution is transferred from the blanket to the substrate. The solution may have an anti-evaporant including glycols and pyrrolidones. A 3D model of the object to be made is developed (Step 102). The 3D model is sliced into layers as described in the earlier patents (Step 104). From this, a plate, or plates are made, depending on the size of the object and the size of the plate (which can contain many layers of the object to be produced), using conventional platemaking methods (Step 106). Each plate (or in order multiple plates) is then clamped or inserted into the printing press (Step 108). Then the substrate, using such materials as non-woven carbon fiber veils, non-woven polyester, silk, cotton, polyactic acid, or polyvinyl alcohol is printed by the plate (Step 110). This process can be done with pre-cut substrate sheets or using a web of substrate, i.e., a continuous roll of material that is fed through the printing step and then cut and stacked at the end of the printing process. After the substrate is printed, the substrate is flooded with a powder, such as a polymer powder (Step 112). The powder adheres to the substrate where the fluid transferred from the printing plate was deposited. The excess powder is removed by using vibration, vacuum or other method, which can done automatically (Step 114). Often the sheets will have registration holes so when they are stacked they can be put on registration pins so they will be aligned. The sheets can now be stacked, cut, or folded and gathered using techniques which are well known in printing trades (Step 116). This process generates a build block, which is then compressed and heated to form 3D objects corresponding to the 3D modes. Then, uncoated substrate material that may remain around the 3D objects is removed.

Like a book each layer of the object corresponds to a page of the book and can be different so that when all the layers are stacked this will result in a three dimensional object. There are multiple pages per sheet in the printing process. This process can be practiced using flexography, lithography, gravure, waterless printing and other printing techniques, including silkscreen. The folded item is then subjected to further conventional treatment as described in earlier applications (Application Nos. U.S. 61/528,537; PCT/US12/52946; U.S. Ser. No. 13/582,939; EP20120828967; U.S. 61/769,724; PCT/US14/18806; U.S. Ser. No. 14/835,685; U.S. Ser. No. 14/835,690; U.S. Ser. No. 14/835,697; U.S. Ser. No. 14/703,372; U.S. 62/243,590) to reveal the 3D object within it (e.g., sandblasting away the non-printed substrate matter).

To provide a concrete example to conceptualize how the process works as it relates to the printing of a book, to generate a pamphlet with 20 pages, only 10 pages are needed since each page is printed on both sides. But in reality only 5 sheets are needed because each sheet can be folded in half like a book so that after folding, there are actually 10 pages that need to be flipped in the pamphlet during reading or writing, with 20 pages needed to be read or written onto. Because the 5 sheets are folded, there will be some excess sheet that will need to be cut according to the sheet size, page size, and signature size.

The advantage of this process among the others described is that it is extremely fast. Printing presses can print large sheets at the rate of thousands of sheets per hour. Conventional tooling is replaced with plate making which is cheap and fast. This reduces the tooling costs by orders of magnitude. This can be accomplished in hours rather than months and the risks and problems of molds are also eliminated since there are no molds. There is substantial improvement in the geometries that can be produced. The range of materials and the material properties is enlarged. It is important that this process works just as well with high performance materials such as carbon fiber as it does with inexpensive material such as PET substrates. In addition, in the instances of polymer substrates, removal is a bulk process that can be accomplished using chemicals or sometimes water. For example, if the substrate is polyvinyl alcohol and the polymer is thermoplastic such as polylactic acid, which is renewable and biodegradable, the excess polyvinyl alcohol substrate can be removed by water (or other aqueous solution). Additionally since the process uses conventional printing technology the substrates can be printed so that decoration and photosculptures can be made as described in application nos. U.S. 61/773,810 and U.S. Ser. No. 14/199,603. In the lithographic example a lithographic press could be modified so that instead of transferring the water (or other aqueous solution) to a blanket and transferring the ink to the blanket and to the page, the aqueous solution could be transferred directly from the plate or the blanket to the substrate, since ink is not necessary in cases where the "printing" of aqueous solution is the central step for creating the layered slice.

Although there is time necessary for final processing including heating, abrasive blasting or chemical removal and these processes add to the time it takes to serially print a part (i.e. get the first part out), the production rate will be the speed of the printing step alone and that can be as fast or faster than injection molding. In other words, when many objects are being printed one after the other, the substrates for one object can be printed while the substrates for the object printed before it are being heated while the substrates for the object heated before it are being subjected to removal. Further, printing step can be performed simultaneously with or in line with the folding so that time to produce a part can be sped up further.

Figure 3:
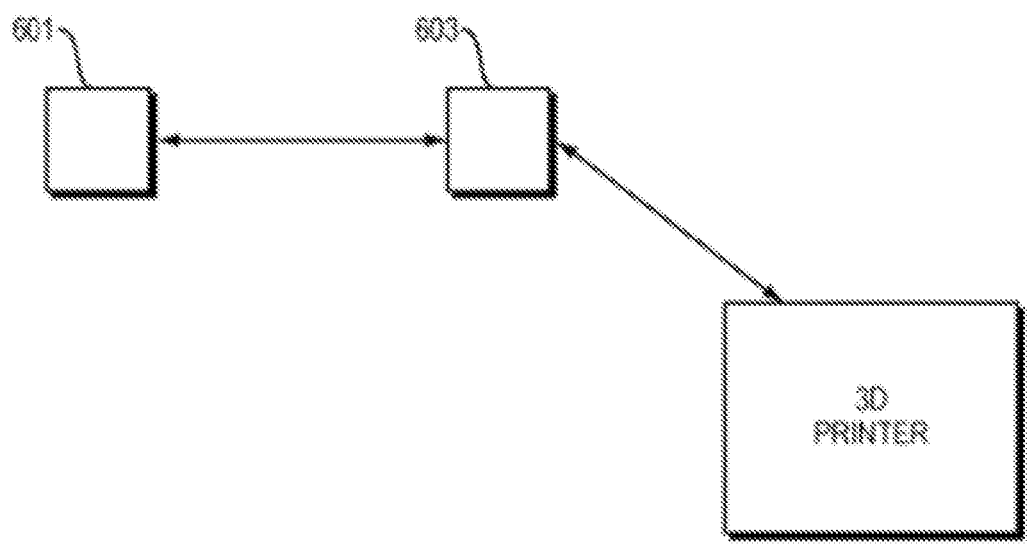
FIG. 3 is a high-level block diagram of processors, in an illustrative implementation of this invention

FIG. 3 is a high-level block diagram of processors, in an illustrative implementation of this invention. A CAD model of a desired 3D object in STL file format is created using a remote processor 601. This processor 601 employs software (such as Netfabb® Studio software) to create a machine-specific build file. The machine-specific build file is exported to a second processor 603. Depending on the particular implementation, this second processor controls the operation, including movements, of: (1) a printing plate or other device that selectively deposits liquid, (2) actuators that spread out the powder on the substrate and then remove the excess powder, (3) a thermal print head, (4) a hot stamp press, or (5) actuators that feed or flip over substrate layers. Alternately, this invention may be implemented with other arrangements of processors. For example, more than one remote processor and more than one onboard processor may be employed, and any of the above tasks may be handled by one or more of these different processors.

Figure 4:
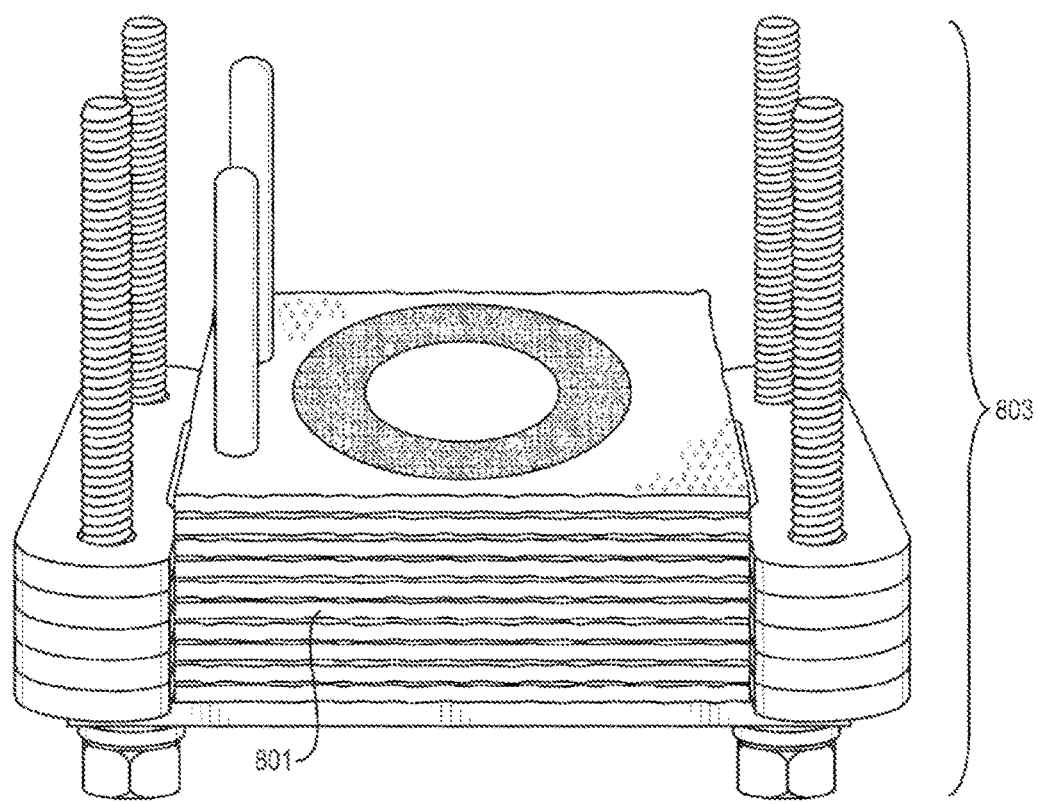
FIG. 4 shows a compressive device, after a number of substrate tiles (layers) have been placed in it, one on top of the other in a compressive device. The tiles are aligned by inserting two registration pins of the compressive device into the two registration holes of each tile, respectively.

FIG. 4 shows a compressive device 803, after a number of substrate tiles (layers) (e.g., 801) have been placed in it, one on top of the other.

Figure 5:
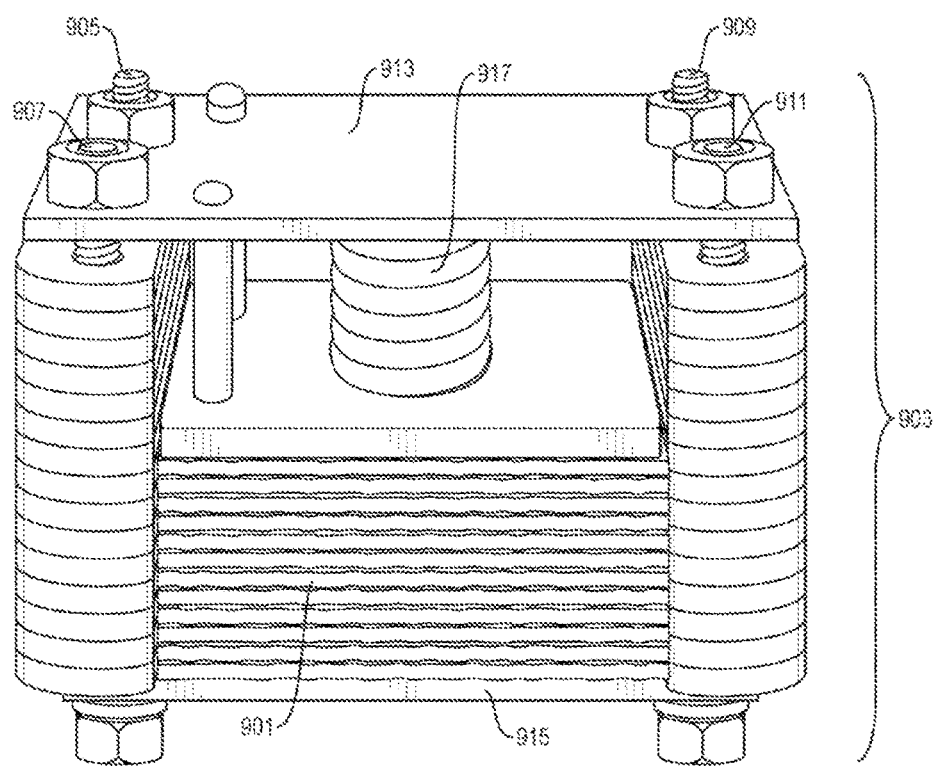
FIG. 5 shows a compressive device, after substrate layers with all of the "slices" of a ring torus have been inserted into it. Springs in the compressive device press the substrate layers together.

FIG. 5 shows substrate layers being compressed in the compressive device 903. Screws 905, 907, 909, 911, plates 913, 915 and a spring 917 in the compressive device are used to exert pressure.

Figure 6:
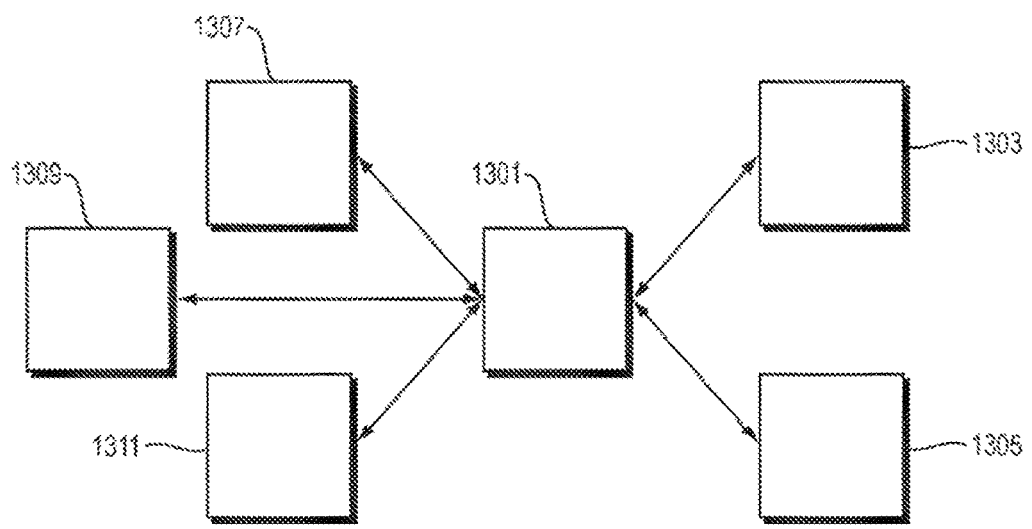
FIG. 6 is a block diagram that shows a processor that controls multiple components of an apparatus for fabricating a 3D object.

FIG. 6 is a high-level block diagram of some hardware that may be used in this invention. One or more processors 1301 control an applicator 1303, a heating element 1305, an actuator 1307, an artificial pressure source 1309, and a stirrer in a container of liquid 1311. The applicator 1303 deposits powder in positive regions, but not in negative regions, of substrate layers. The heating element 1305 transforms the powder into matter that flows and then hardens. The resulting hardened material is disposed in a spatial pattern that infiltrates the substrate layers. The artificial pressure source 1309 may comprise a press, clamp, spring, elastic element, or other device for compressing the substrate layers. The stirrer may be used to stir a liquid that is used for removing excess substrate.

Figure 2:
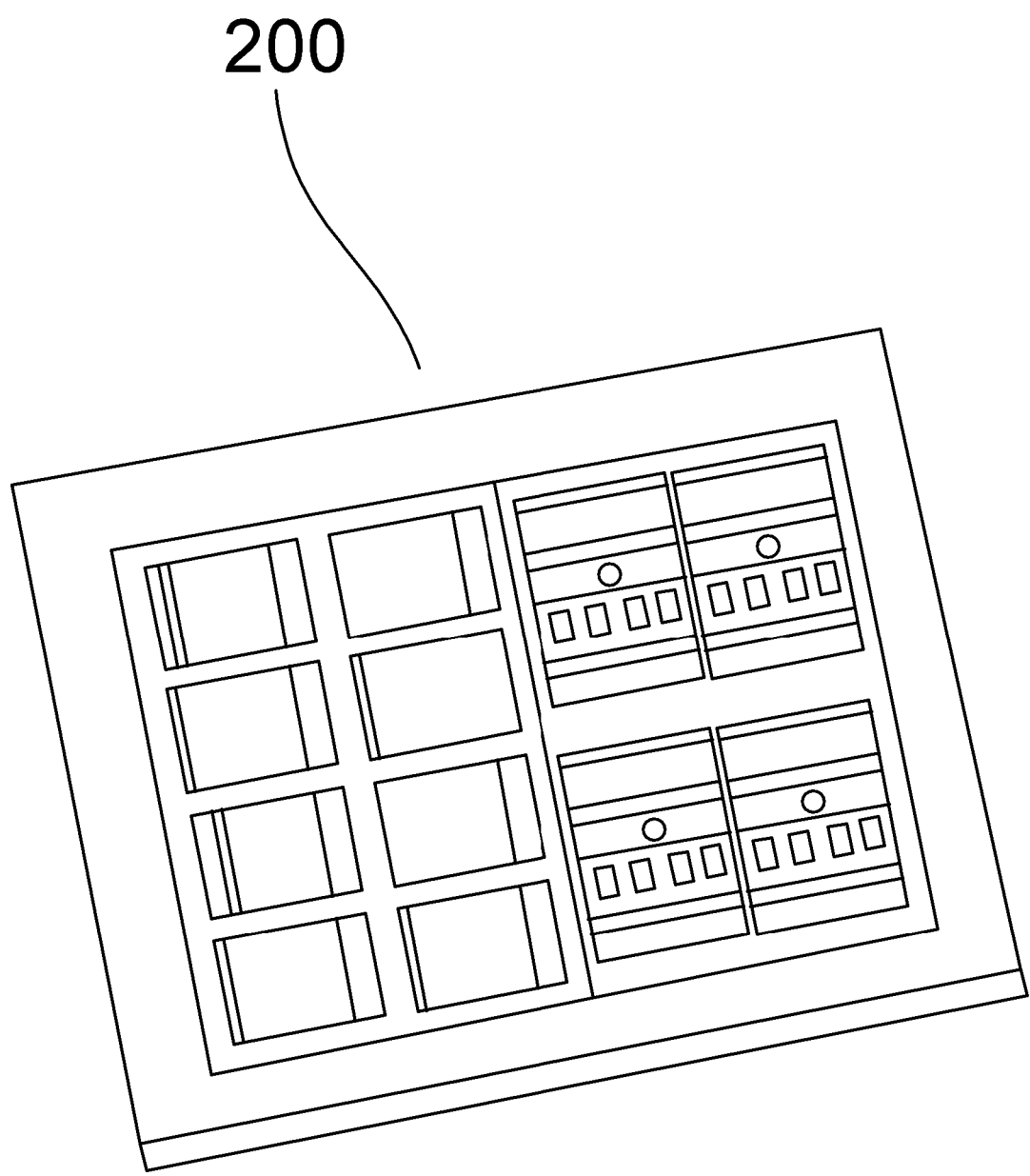
FIG. 2 shows an example printing plate used by the present invention.
Figure 7:
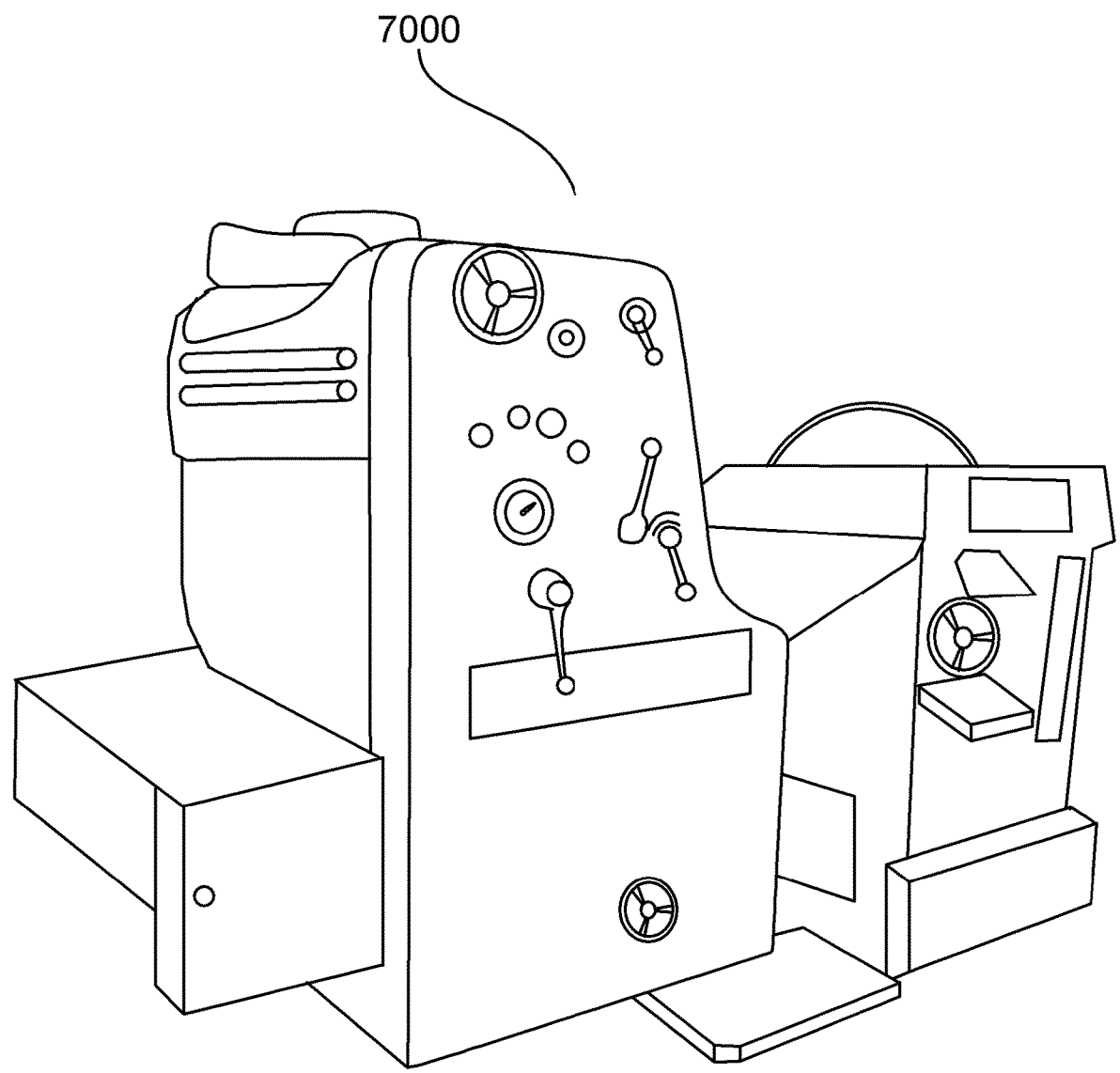
FIG. 7 shows an example printing press used by the present invention.
Figure 8:
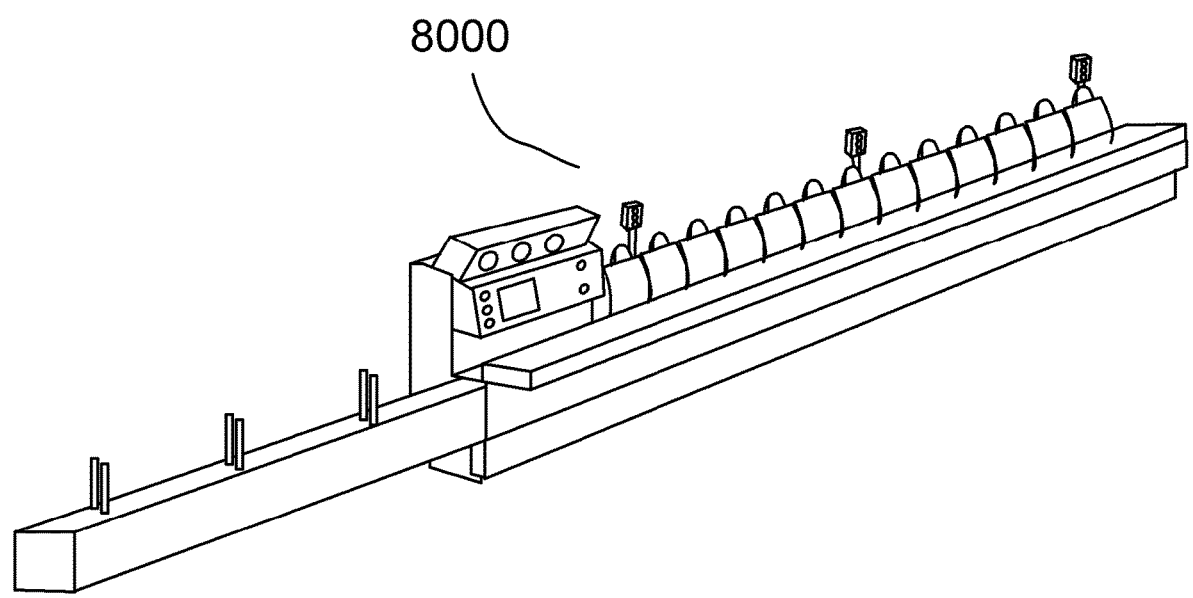
FIG. 8 shows an example gathering machine used by the present invention.
Figure 9:
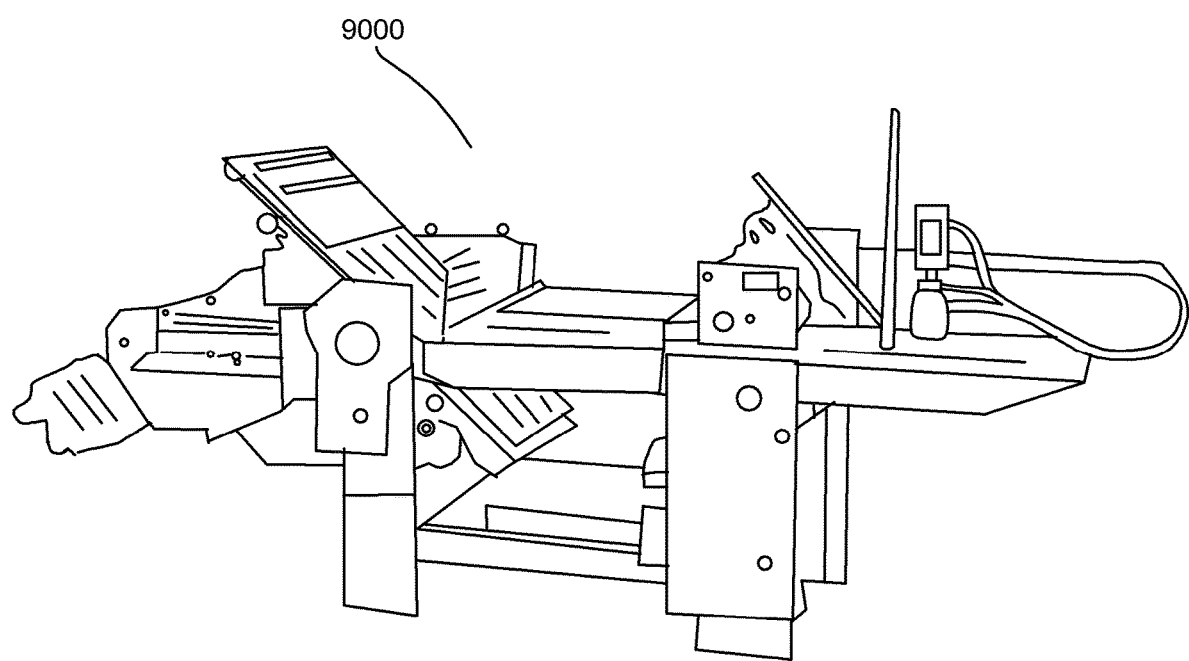
FIG. 9 shows an example folding machine used by the present invention.

FIG. 2 shows an example printing plate 200 of a type that may be usable by the present invention. FIG. 7 shows an example press 7000 of a type that may be usable by the present invention. FIG. 8 shows an example gathering machine 8000 of a type that may be usable by the present invention. FIG. 9 shows an example folding machine 9000 of a type that may be usable by the present invention.

Figure 10:
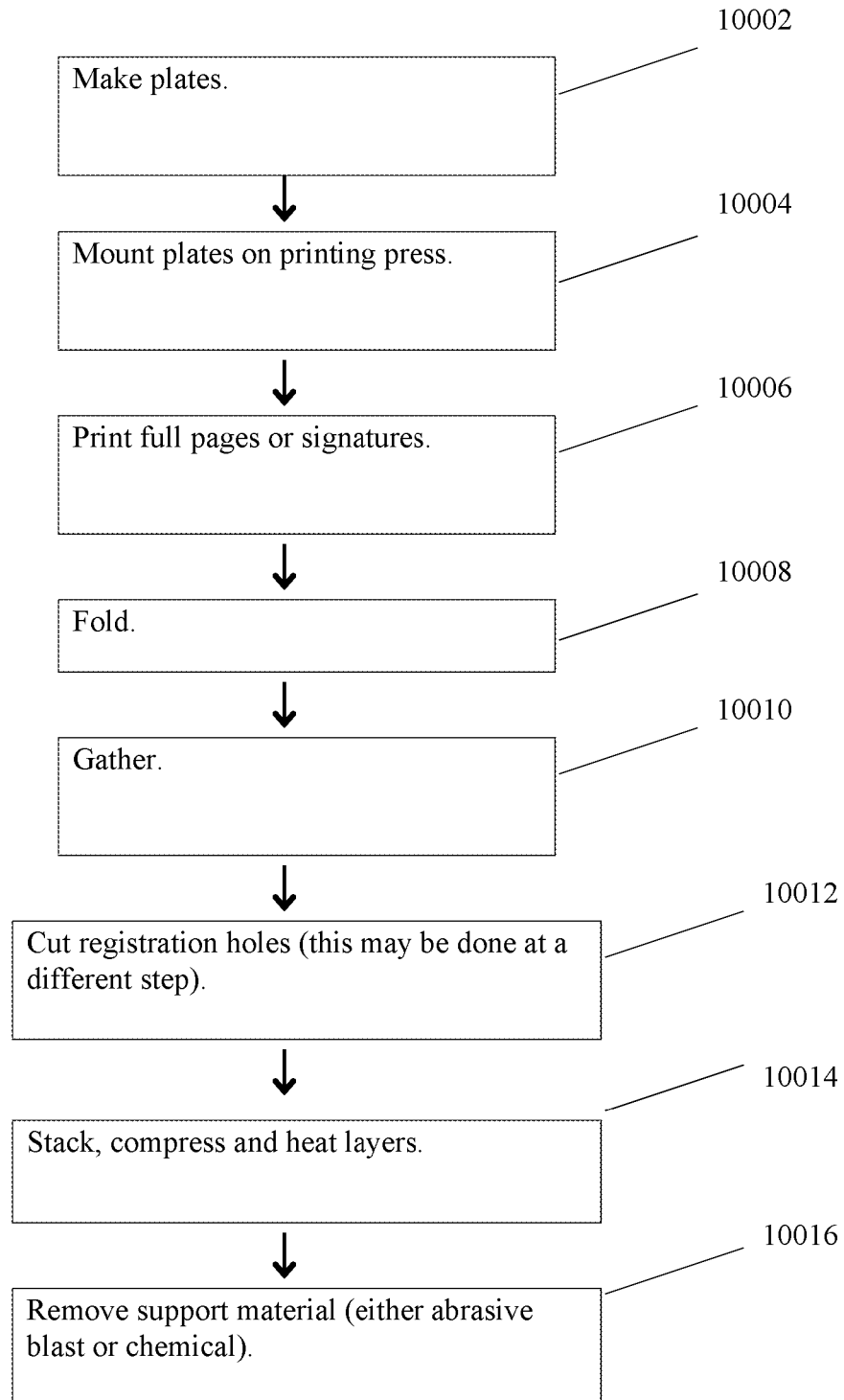
FIG. 10 is a flowchart illustrating another embodiment of the process for additive manufacturing of a 3D object.

FIG. 10 is a flowchart illustrating another embodiment of the process for additive manufacturing of a 3D object. The steps involve making plates (step 10002), mounting plates on a printing press (step 10004), printing full pages or signatures (step 10006), folding the layers of substrate (step 10008), gathering the layers of substrate (step 10010), cutting registration holes of each sheet (step 10012), stacking, compressing and heating the layers (step 10014), and removing support material (excess substrate) either by abrasive blast or chemical (step 10016).

The invention claimed is:

1. An apparatus for producing a three-dimensional (3D) object in a composite-based additive manufacturing (CBAM) process, the apparatus comprising:
   a processor;
   a digital file on the processor containing the 3D object sliced into a plurality of layers;
   one or more lithographic printing plates formed using the digital file of the 3D object, each lithographic printing plate having a print pattern containing a representation of two or more layers of the plurality of layers of the 3D object;
   a printing press into which one of the one or more lithographic printing plates is clamped or inserted;
   the printing press configured to utilize the inserted lithographic printing plate to transfer a solution in the print pattern onto a substrate, wherein the solution enables powder to adhere thereon such that the print pattern on the substrate is stackable to form two or more layers of the 3D object via the adhered powder.

2. The apparatus of claim 1, wherein the printing press uses a printing technology chosen from the group consisting of flexography, lithography, offset, waterless printing, and silkscreen.

3. The apparatus of claim 1, wherein the substrate is a material chosen from non-woven carbon fiber veils, non-woven polyester, silk, cotton, polylactic acid, or polyvinyl alcohol.

4. The apparatus of claim 1, wherein the solution is an aqueous solution containing an anti-evaporant, and wet aqueous images are printed using the aqueous solution.

5. The apparatus of claim 4, wherein the anti-evaporant is chosen from the group consisting of glycols and pyrrolidones.

* * * * *